(No Model.)
O. S. HARMON.
COMBINED NAIL EXTRACTOR AND BOX OPENER.
No. 344,653. Patented June 29, 1886.
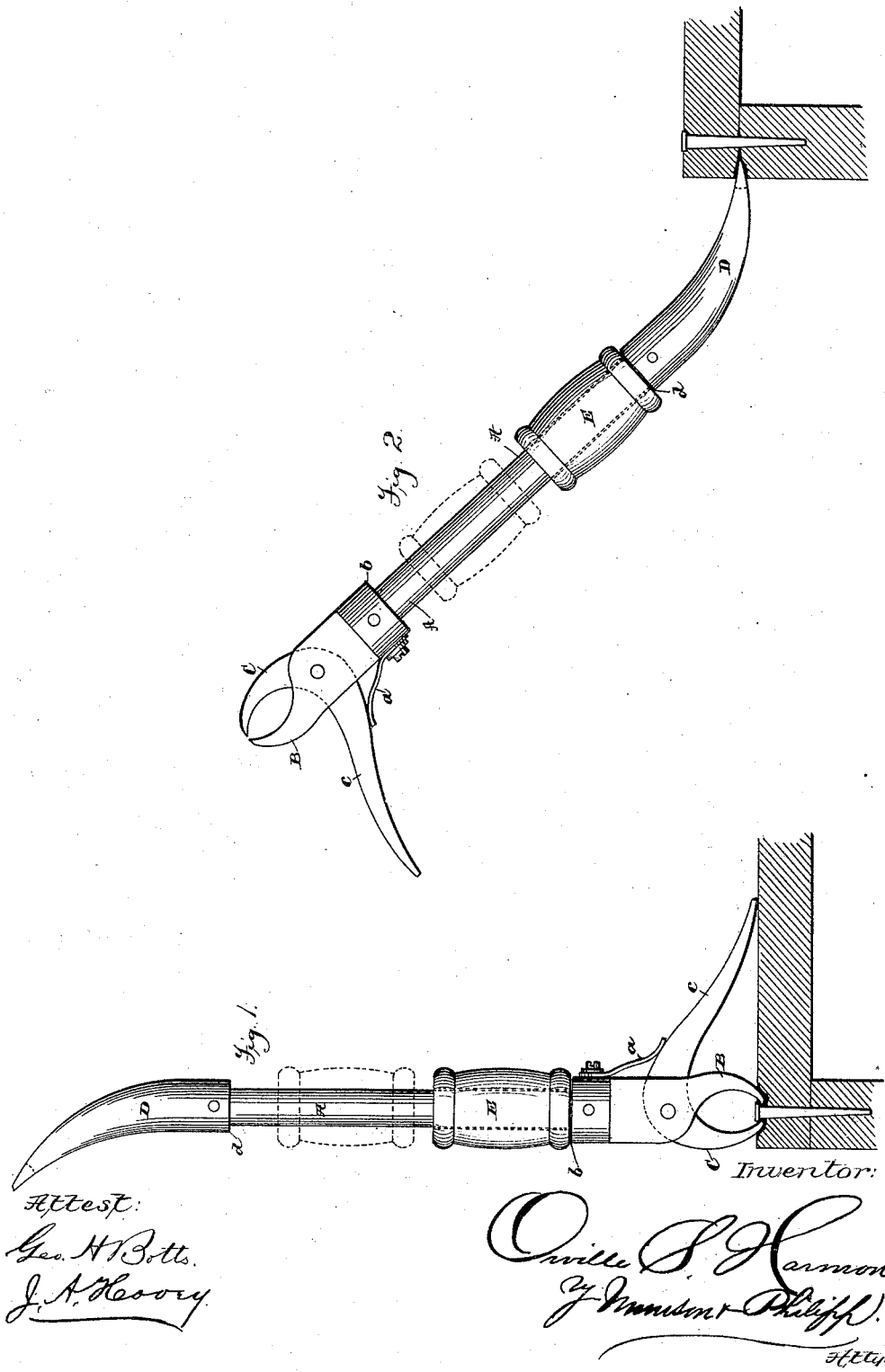

UNITED STATES PATENT OFFICE.

ORVILLE S. HARMON, OF BROOKLYN, NEW YORK, ASSIGNOR TO P. LORILLARD & CO., OF JERSEY CITY, NEW JERSEY.

COMBINED NAIL-EXTRACTOR AND BOX-OPENER.

SPECIFICATION forming part of Letters Patent No. 344,653, dated June 29, 1886.

Application filed April 1, 1886. Serial No. 197,401. (No model.)

*To all whom it may concern:*

Be it known that I, ORVILLE S. HARMON, a citizen of the United States, residing at Brooklyn, county of Kings, and State of New York, have invented certain new and useful Improvements in Combined Nail-Extractor and Box-Opener, fully described and represented in the following specification and the accompanying drawings, forming a part of the same.

This invention relates to a combination implement which embodies both a nail-extractor and a box-opener, it being the object of the invention to provide a single tool or implement by which all of the operations usually necessary in opening a box can be performed.

As a full understanding of the invention can be best given by a detailed description of the implement embodying the same, all preliminary description will be omitted and a full description given, reference being had to the accompanying drawings, in which—

Figure 1 is a view of the combination implement, illustrating its use as a nail-extractor; and Fig. 2 is a similar view, illustrating the use of the implement as a box-opener.

Referring to said figures, it is to be understood that the implement consists of a shank, A, one end of which is provided with the usual jaws, B C, for grasping the nail below the head when the implement is used as an extractor. The jaw B is made rigid with the shank A in the usual manner, and the jaw C is pivoted to the jaw B, and is provided with the usual arm, $c$, which serves as a lever for closing the jaws upon the nail, and also as a fulcrum for withdrawing the nail from the wood. The opposite end of the shank A is provided with a curved chisel, D, the edge of which is adapted to be inserted between the boards of the box, so that the chisel can be used as a lever to pry them apart in the manner common in box-openers.

The jaw B and the chisel D are provided at the points of their union with the shank with shoulders $b\ d$, and the shank is provided between these shoulders with a rammer, E, which is arranged to slide along the shank, so as to operate against either of the shoulders $b\ d$, as may be required.

The manner of using the implement thus constructed is as follows:

When the implement is to be used as an extractor, the jaws B C will be placed at the sides of the nail-head, and the rammer E will be operated against the shoulder $b$, so as to sink the jaws into the wood to a point below the nail-head, as shown in Fig. 1. By then moving the upper end of the shank A so as to cause the arm $c$ to bear against the box, the arm will act as a lever to close the jaws and grasp the nail below the head, and at the same time will act as a fulcrum for the jaws and shank in drawing the nail out of the wood. The arm $c$ may be provided with a spring, as $a$, which will act to hold the jaws open, so that they will always be in position to straddle the nail-head.

When the implement is to be used as a simple box-opener, the edge of the chisel D will be inserted into the joint between the two boards, and the rammer E will be operated against the shoulder $d$, so as to drive the chisel into the joint to any desired distance, as shown in Fig. 2. The shank A and the chisel will then be used as a lever to pry the boards apart in the usual manner. The edge of the chisel may be used in this manner, if desired, to cut the nails which hold the boards together. The edge of the chisel may also, if desired, be provided with an ordinary nail-claw, so as to be used as a claw-bar.

What I claim is—

The herein-described combined nail-extractor and box-opener, consisting of the shank A, having the chisel D at one end and the jaws B C at the other, one of said jaws being provided with the arm $c$, and the rammer E, located between the jaws and chisel, and arranged to move along the shank and operate against either the jaws or chisel, substantially as described.

In testimony whereof I have hereunto set my hand in the presence of two subscribing witnesses.

ORVILLE S. HARMON.

Witnesses:
J. A. HOVEY,
JAS. J. KENNEDY.